United States Patent Office 3,362,955
Patented Jan. 9, 1968

3,362,955
PROCESS FOR THE PREPARATION OF MELAMINE
Ferdinand Weinrotter, Linz, Walter Müller, Leonding, near Linz, and Alfred Schmidt and Walter Böhler, Linz, Austria, assignors to Osterreichische Stickstoffwerke Aktiengesellschaft, Linz (Danube), Austria
No Drawing. Filed Jan. 21, 1966, Ser. No. 522,053
Claims priority, application Austria, Mar. 8, 1965, A 1,993/65
8 Claims. (Cl. 260—249.7)

The present invention is concerned with a process for the preparation of very pure melamine by a continuous and essentially pressureless catalytic procedure, starting from cyanic acid gas and gaseous ammonia and employing per se known melamine catalysts. The objective of the invention is the direct production of melamine of such purity that the raw product has an N-content of at least 66.6 percent, so that neither recrystallization nor any other industrially uneconomical purification procedure is necessary to satisfy commercial requirements for pure melamine.

Melamine has heretofore been prepared catalytically from urea and/or thermal decomposition products thereof. In this connection, use has been made, as catalysts, of silica gel, alumina, aluminum silicates and many others, as such or after treatment thereof with promoters such as borates, phosphates, sulfates, etc., or the corresponding acids. Such processes for the production of melamine require a reaction temperature of from 250° C. up to 450° C., a temperature of 400° C. being usually maintained.

According to another process, cyanic acid is converted over silica gel chiefly to melamine at 200 to 400° C. and chiefly to cyanamide at 450 to 650° C.

While the literature is thus considerably concerned with data relative to the synthesis temperatures, the literature indications relative to the purity of directly obtained products in melamine synthesis are meager. Disclosures relating to the purity of the raw product fluctuate between 90 and 99.5% melamine. In the latter case, however, the crude product always has to be purified, by recrystallization and/or by an alkaline aftertreatment, before it can be brought to a melamine content of 99.5%, and this regardless of whether dicyandiamide or urea is the starting material. Proposed special spatial arrangement of catalyst and/or special cooling prescriptions have achieved no essential improvement in this regard. The apparatus was always merely rendered more complicated and the carrying out of the process, including the thus-required purfication of the crude product, merely became more expensive and thus uneconomical.

In sharp contrast to the foregoing, the present invention makes it possible, by means of a very simplified procedure requiring the use of uncomplicated apparatus, directly to obtain melamine of such purity that after-purification, for instance by recrystallization, is unnecessary.

According to the present invention, it is surprisingly possible, in a continuous catalytic, practically pressureless (up to at most two atmospheres excess pressure) melamine synthesis to obtain melamine of a purity—of the directly obtained product—of about 99.9%, by passing the initial mixture of gases through an uncooled and not specially spatially arranged catalyst layer, i.e., through a single catalyst layer which is constantly maintained by the heat of reaction at a temperature above 450° C. and up to 500° C., preferably between 465 and 475° C., the reaction heat being dissipated as perceptible heat of the reaction gas mixture. At these temperatures, which are unusually high for the catalytic synthesis of melamine from cyanic acid gas and ammonia gas, the reaction gas mixture can not include—in addition to melamine vapor, gaseous ammonia and carbon dioxide and small amounts of unreacted cyanic acid gas—any other chemical compound which might contaminate the melamine after its separation. This result is assured by quenching the hot reaction gas mixture as rapidly as possible in per se known manner in a flowing aqueous cooling medium, whereby the melamine separates out in the solid, no longer reactive state in aqueous suspension and the other constituents of the reaction gas mixture can thus be readily separated from the solid material.

The melamine thus collects as a suspension of small crystals in the aforesaid aqueous cooling medium, which is advantageously circulated, and these crystals are separated from the suspension by filtration or centrifuging, and then dried. The small residue of cyanic acid gas in the reaction gas is, after cooling, in solution in the aqueous melamine suspension as urea and is completely washed out of the melamine on the centrifuge or on the filter with a small quantity of water. Residual adherent ammonia or carbon dioxide on the moist melamine filter cake evaporates during the drying. Difficultly soluble compounds, such as ammeline, ammelide, melamine cyanurate, ammeline cyanurate, desamination products of melamine, etc., are no longer detectable by conventional test methods. The dry melamine has a nitrogen content of 66.60 to 66.63% N (theoretical is 66.63%) and is practically pure.

It is also surprising that at the synthesis temperatures maintained according to the invention (above 450 and up to 500° C., preferably between 465 and 475° C.), using a good melamine synthesis catalyst such, e.g., as active alumina, silica gel, etc., the conversion of cyanic acid to melamine is only slightly reduced and, in general, lies between 90 and 97%, which is quite acceptable in comparison with the optimal yields (98%) obtained, according to the literature, at synthesis temperatures between 420 and 440° C., when the other advantages of the process of the present invention are taken into consideration. Only when the conversion drops below 90% do impurities such as melamine cyanurate appear in detectable amounts, but such appearance is easily and rapidly detected by the per se known clouding test. In such event, the catalyst is preferably regenerated or replaced by fresh catalyst.

The prification of the melamine, for example by recrystallization, which is necessary according to the prior known processes, requires—because of the relatively difficult solubility of melamine—large quantities of liquid and a considerable involvement of apparatus and expenditure of energy. The omission of these expedients and apparatus further enhances the industrial efficiency of the process of this invention.

A further improvement relative to the conventional mode of operation resides in the fact that the maintenance of the high synthesis temperature—with a single passage of the synthesis gas mixture through a single relatively low catalyst layer at uniform gas inlet temperature—makes it possible to select a high cyanic acid concentration in the starting mixture, since the high temperature difference between the ingoing and outflowing synthesis furnace gas makes it possible to dissipate more reaction heat as perceptible heat of the reaction gas mixture.

The starting gas mixture of cyanic acid and ammonia is prepared in per se known manner, and such preparation is as such not part of the present invention proper. However, it is of significance for the process of this invention that solid starting materials of the heretofore conventional melamine synthesis, such as urea, biuret, cyanuric acid and the like are not directly brought into contact with the hot melamine catalyst. Only a pure gaseous mixture of cyanic acid and ammonia, obtained in a pre-interposed decomposer by extremely rapid thermal decomposition, is brought into contact with the hot melamine catalyst. Only in this way is it possible to avoid from the outset impurities in the catalyst and in the synthesis gas.

For optimal results as to purity and yield of directly obtained melamine under the conditions according to this invention, it is preferred to employ a large synthesis furnace with a catalyst layer volume of above 1 cubic meter, whereupon a high melamine yield of the afore-indicated high purity of the directly obtained melamine is definitively assured.

With small synthesis furnaces with contact layer diameters of several decimeters or when employing an arrangement of contact material in heated, cooled or thermally insulated conduits of a few centimeters in diameter, a contact temperature or a conduit wall temperature above 450° C. gives a poor yield of melamine and, moreover, the raw melamine is highly contaminated with impurities.

With the required high synthesis furnace yields and the thereby entailed consumption of large quantities of contact material, the latter, i.e. the catalyst, is according to this invention advantageously employed in layer heights of about ½ meter and the diameter or the width of the catalyst layer is preferably up to several-fold the said height and even up to 10 meters or more.

The following example sets forth a presently preferred illustrative, but not at all limitative embodiment of the invention.

*Example*

A starting gas mixture of 49 cubic meters of cyanic acid and 361 cubic meters of ammonia is passed hourly through a single, loose, granular catalyst layer of 3150 kilograms of active alumina in coarse grained form, the volume of such catalyst amounting to about 3.5 meters. The catalyst-filled chamber is preferably cylindrical, the circular bottom surface being 9.8 square meters in area and the height of the catalyst layer being about 0.36 meter. The catalyst layer is neither extraneously heated nor extraneously cooled. The temperature of the cyanic acid-ammonia gas mixture upon entry thereof into the catalyst layer is 320° C. During the synthesis, the temperature of the catalyst layer, as measured by thermoelements, is 470° C. In a single passage of the starting gas mixture through the catalyst layer, there is a 95% conversion. All the reaction heat liberated at the contact layer is dissipated as perceptible heat of the reaction gas mixture.

The hot reaction gas is, directly upon leaving the synthesis furnace, cooled by means of a circulating aqueous melamine suspension and the thus-accumulated finely crystalline melamine is separated off by means of a centrifuge. Care must be taken in this regard that the hot synthesis gas comes into contact with cooler particles which are not washed with cooling liquid. Unconverted cyanic acid (at most 5% of the initial amount) will be in solution as urea in the cooling liquid. To avoid too great an accumulation of urea in the said liquid, a portion of mother liquor circulated back from the centrifuge is from time to time withdrawn. The gaseous ammonia and carbon dioxide contained in the reaction gas mixture is dissolved only in small amount in the aqueous melamine suspension. The major portion leaves the suspension container as $NH_3/CO_2/H_2O$ vapor mixture and can be salvaged.

The centrifuged melamine is washed free of urea and the wash water is added to the melamine suspension. The centrifuge wet melamine is then dried. Impurities in the dried melamine are not detectable by conventional tests. In any event, the impurities which can cause clouding lie Below 0.1% _____ Ammeline+ammelide.
Below 0.01% _____ Melamine cyanurate.
(Ammeline and ammelide cyanurate).
Residual moisture is below 0.01%.
Ash is below 0.01%.

Color test: below 20 APHA.

The determined nitrogen value of the melamine is 66.62% N. In other words, even without recrystallization, the melamine has a purity of about 99.90%.

Under the recited conditions, the catalyst retains its activity for months.

The conversion takes place essentially at atmospheric pressure, the only pressure employed being that required to effect passage of the initial gaseous reaction mixture uniformly through and throughout the catalyst layer.

Having thus disclosed the invention, what is claimed is:

1. In a process for the production of melamine by the conversion of melamine-yielding gases in contact with a catalyst at elevated temperature, the improvement according to which the starting material is a mixture of cyanic acid gas and gaseous ammonia and the catalytic conversion temperature is in the range from above 450 up to 500° C., the initial temperature of said mixture being below said conversion temperature and the sole source of additional heat being the heat of reaction of the conversion reaction, whereby melamine of an N-content of at least 66.6% is directly produced, and the said melamine is separated from the reaction mixture.

2. The improvement according to claim 1, wherein the produced melamine is separated from the reaction gas leaving the catalyst layer by cooling in an aqueous cooling medium.

3. The improvement according to claim 1, wherein the catalytic conversion temperature is in the range from 465 to 475° C.

4. The improvement according to claim 3, wherein the contact between melamine-yielding starting material and the catalyst is effected by a single pass of said starting mixture through the catalyst.

5. The improvement according to claim 4, wherein the catalyst is in the form of a simple layer of loose granular material.

6. The improvement according to claim 5, wherein the extent of the catalyst layer normal to its height is a multiple of such height.

7. The improvement according to claim 6, wherein the height of the catalyst layer is at most about ½ meter.

8. The improvement according to claim 6, wherein the volume of catalyst layer is at least about 1 cubic meter.

References Cited

UNITED STATES PATENTS 3,112,312   11/1963   Veltman et al. _____ 260—249.7

OTHER REFERENCES

Tiselius et al.: (Ed.) "The Svedberg," Almqvist & Wiksells, Pub., Uppsala, Sweden (1945), pp. 344.51.

JOHN D. RANDOLPH, *Primary Examiner.*

J. M. FORD, *Assistant Examiner.*